(12) United States Patent
Sørensen

(10) Patent No.: US 9,181,926 B2
(45) Date of Patent: Nov. 10, 2015

(54) BLADE PITCH LOCK SYSTEM FOR A WIND TURBINE

(75) Inventor: Carsten Bendix Sørensen, Hoejbjerg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 593 days.

(21) Appl. No.: 13/597,532

(22) Filed: Aug. 29, 2012

(65) Prior Publication Data

US 2013/0058784 A1    Mar. 7, 2013

(30) Foreign Application Priority Data

Sep. 2, 2011 (DK) ................................. 2011 70490

(51) Int. Cl.
*F03D 11/00* (2006.01)
*F03D 7/02* (2006.01)
*F03D 1/00* (2006.01)

(52) U.S. Cl.
CPC .............. *F03D 7/0224* (2013.01); *F03D 1/003* (2013.01); *F05B 2260/30* (2013.01); *F05B 2260/79* (2013.01); *Y02E 10/721* (2013.01); *Y02E 10/723* (2013.01)

(58) Field of Classification Search
CPC .. F05B 2260/79; F05B 2260/70; F03D 1/001; F03D 1/06; F03D 1/0658; F03D 1/0691; F03D 7/0224; F03D 11/005; F16H 57/10; F03B 3/14; F03B 3/145; F03B 11/06
See application file for complete search history.

(56) References Cited

U.S. PATENT DOCUMENTS

| | | | |
|---|---|---|---|
| 5,176,267 A * | 1/1993 | Pech | 212/180 |
| 6,199,442 B1 | 3/2001 | Bauer et al. | |
| 8,206,111 B2 * | 6/2012 | Aarhus et al. | 416/169 R |
| 8,899,638 B2 * | 12/2014 | Flamm | 292/279 |
| 2010/0021299 A1 * | 1/2010 | Aarhus et al. | 416/31 |
| 2011/0044813 A1 | 2/2011 | Lindberg et al. | |
| 2011/0132119 A1 * | 6/2011 | Flamm | 74/434 |
| 2012/0134806 A1 * | 5/2012 | Andersen et al. | 416/1 |

FOREIGN PATENT DOCUMENTS

| | | |
|---|---|---|
| CN | 101535635 A | 9/2009 |
| CN | 201433851 Y | 3/2010 |
| DE | 100 31 472 C1 | 4/2002 |
| DE | 10 2004 017 323 A1 | 11/2005 |
| EP | 1 167 754 A2 | 1/2002 |

* cited by examiner

*Primary Examiner* — Nathaniel Wiehe
*Assistant Examiner* — Eldon Brockman
(74) *Attorney, Agent, or Firm* — Roberts Mlotkowski Safran & Cole, PC

(57) ABSTRACT

A pitch lock system for a wind turbine with a rotor having at least one pitchable or at least partially pitchable blade connected to the rotor at a interface, the blade having an outer blade part and an inner blade part, the blade parts being interconnected at an interface, having a pitch bearing construction with a first bearing ring and a second bearing ring for pitching at least a part of the blade in relation to the rotor. The pitch lock system has a movable toothed segment for interacting with at least one toothed element, and where the pitch lock system further includes an actuator for activating and moving the movable toothed segment into engagement with the toothed element, and thus, locking the pitch bearing construction and thus locking the pitch bearing in the actual position.

13 Claims, 7 Drawing Sheets

BLADE PITCH LOCK SYSTEM FOR A WIND TURBINE

BACKGROUND OF THE INVENTION

1. Field of the Invention

The present invention relates to a pitch lock system for a wind turbine with a rotor, said rotor comprising at least one pitchable blade, said at least one blade being a traditional pitch blade connected to said rotor at a interface or being at least one partial pitch blade, said at least one partial pitch blade comprising a outer blade part and a inner blade part, where said blade parts are interconnected at a interface, said interface comprising a pitch bearing construction with a first bearing ring and a second bearing ring, for pitching at least a part of said blade in relation to said rotor, wherein the pitch lock system comprises a movable toothed segment for interacting with at least one toothed element, where said toothed segment is slideably connected with one of the first or the second bearing ring, and where said toothed element is in fixed connection with the other of the first or second bearing ring, and where the pitch lock system further comprises an actuator for activating and sliding/moving said movable toothed segment in a direction parallel to a radial direction of the bearing ring and into engagement with said toothed element and thus locking the pitch bearing construction.

2. Background of the Invention

It is well known that wind turbines have some kind of brake or lock system for braking and/or locking the rotor of the turbine in a specific position during repair work or other situations where there is a need for a secure stand still of the rotor. Also systems for locking the individual blades of a wind turbine in specific positions are known.

DE 10 2004 017 323 A1 teach a solution to the problem with slack and wear between the parts that are used for pitching a blade for a wind turbine into certain positions. The problem can be solved by using some kind of locking mechanism e.g. a bolt that is placed in a corresponding hole or by having some kind of brake mechanism build into the pitch bearing. Such a brake system can be a disc brake, a magnet brake or a drum brake. By using a bolt lock mechanism a very simple solution is obtained, but the blade can only be locked in predetermined positions and thus the solution is somewhat static. By using a brake system, the possibility to position the blade in a very specific position is possible, but installing a brake system is a rather complex job and further the system can not provide a foolproof locking of the blade.

US 2011/0044813 A1 also shows a pitch lock mechanism, for locking the pitch bearing system in a fixed position, but this system has the disadvantage that the pitch bearing only can be locked in one or more specific positions, which does not allow for dynamic and free choice of locking position. This system has the same drawbacks as the system discussed above.

EP 1 167 754 A2 concerns a locking mechanism for a wind turbine rotor, where the locking mechanism is integrated into a disc brake system. In one embodiment of the system, the disc is locked in a fixed position by a toothed segment, and in another embodiment the disc can be turned by the locking parts.

A brake or lock system for a pitch bearing construction on a wind turbine is normally arranged between the outer ring and the inner ring of a pitch bearing, which typically is a ball bearing. The outer ring will often be fixed to the hub of a wind turbine and the inner ring will be fixed to the blade. The blade will thus be able to be pitched—turned—in a longitudinal direction of the blade. This movement will often be facilitated by an electro motor and a gear unit or by a hydraulic unit. The unit will normally be acting with a sprocket on a toothed element on the inner ring of said bearing. The pitch bearing construction can be held in a given position, but at the interface between the sprocket and the toothed element is the teeth of the parts; there will always be some slack between the parts. Further the unit cannot provide a safe and secure mechanical locking of the pitch bearing construction.

As the above mentioned solutions the solution in EP 1 167 754 A2 is also designed to block a turning movement at certain specific positions. This can in one embodiment be done by pushing a toothed brake block into engagement with a toothed element on the slewing ring. It is however only possible to engage the brake block when it is aligned with the teeth on the toothed element. In other words the brake will only work if and when a full alignment of the two parts has taken place. Especially during repair work this is not always possible. If a pitch gear is blocked and has to be repaired or replaced it is very important to be able to perform a full locking of the inner ring in relation to the outer ring, before doing any work at the pitch bearing. This is not possible with any of the above mentioned solutions and thus a number of straps, pulleys and other tools must be taken in action, which is very time consuming an still does not provide a secure locking of the various parts.

None of the above mentioned systems show a pitch lock system for a wind turbine that solves the problem of preventing slack in the system and at the same time being a sturdy and robust locking system, comprising a mechanical lock, where the locking position is completely individual, meaning that the pitch bearing construction can be locked in every possible position.

SUMMARY OF THE INVENTION

It is an object of the invention to provide a pitch lock system for a pitch bearing construction on a wind turbine that provides a mechanical lock, said mechanical lock being possible to activate at every possible position of the pitch bearing construction. Further it is the object of the invention to interact with constructional parts of said pitch bearing construction in order to minimise the need for installing additional parts in said construction.

As mentioned above the invention relates to a pitch lock system for a wind turbine comprising a pitch bearing construction with a first bearing ring and a second bearing ring, for pitching at least a part of a blade in relation to a rotor. The invention relates to a pitch lock system to be used in relation with a pitch bearing construction for a traditional pitch controlled wind turbine, but also to pitch bearing constructions for the type of wind turbines known as partial pitch wind turbines, where the pitch bearing construction is arranged between an inner blade part and an outer blade part.

Further the pitch lock system comprises a movable toothed segment for interacting with at least one toothed element, where said toothed segment is slideably connected with one of the first or the second bearing ring, and where said toothed element is in fixed connection with the other of the first or second bearing ring, and where the pitch lock system further comprises an actuator for activating and sliding/moving said movable toothed segment in a direction parallel to a radial direction of the bearing ring and into engagement with said toothed element and thus locking the pitch bearing construction.

By activating the toothed segment it is moved into contact with the toothed element and thus locking the pitch bearing in the actual position. The toothed element can be installed with the sole purpose of locking the pitch bearing, but is preferably the same toothed element that is used for pitching the outer blade part via means designed for that purpose. Typically the pitch bearing comprises a toothed element along the inner edge on one of the bearing parts which is in mechanical engagement with a gear mechanism by which the pitch bearing can be moved. By using the same toothed element for locking the pitch bearing, there is no need for installing further means, but the movable toothed segment that when interacting with the toothed element will lock the rotor.

At a pitch lock system for a wind turbine according to the invention, the toothed segment is arranged on a fixture, where said fixture comprises means for adjusting of the fixture in a direction partly or fully orthogonal to the radial direction, in relation to the toothed element. By having such a fixture it becomes possible to lock the pitch bearing system in any possible position, as the fixture allows the toothed segment to be positioned in exactly the right position in relating to the toothed element. With a solution according to the invention, a pitch bearing system can be locked in any specific angular position, and does not rely on locking bolts or apertures therefore to be aligned in one of a few specific positions.

Such a fixture can be made with long holes for manually positioning and fixation prior to locking the pitch bearing system, but it can also be made more automatically.

In a preferred embodiment of a pitch lock system according to the invention, the toothed element has a circular arc shape, where the teeth are placed on the inside of said circular arc. This allows for the locking system to be installed inside a blade together with other parts of a pitch bearing.

A pitch lock system for a wind turbine according to the invention can in a preferred embodiment comprise a toothed segment comprising at least two teeth, where said at least two teeth are arranged for engaging with at least two corresponding teeth on said toothed element. By having an engagement of at least two teeth and preferably by even more teeth, a very strong, robust and solid locking is possible compared to only having one tooth engaged, where the load has to be carried by the very small contact area where one tooth on a locking element is engaged with the flanks of two teeth on the other part or vice versa.

A pitch lock system for a wind turbine according to the invention comprising a fixture for orthogonal adjusting in relation to said radial direction of a toothed segment can, as mentioned, be designed for automatic orthogonal adjusting, where said means comprises at least one guide rail arranged non-parallel to the radial direction and thus with an angle different from 90° to the toothed element, for guiding the fixture comprising the toothed segment in an orthogonal direction, if and/or when the teeth of the respective parts are in a colliding position, where said fixture and the toothed segment is arranged on a sliding block, said sliding block being guided by said at least one guide rail. By installing the toothed segment on a sliding block, it becomes possible to move the toothed segment into a position where an exact and precise locking can be effected. The guide rail secures that the sliding block is moved along a predetermined track in order to make a proper and perfect engagement between the toothed segment and the toothed element.

In a preferred embodiment of a pitch lock system for a wind turbine according to the invention, the fixture comprises biasing means for biasing said sliding block in a direction towards the toothed element. By having said biasing means e.g. one or more mechanical springs, the sliding block will always— when activated—be pushed towards an engaged and locked position. This and other of the embodiments will be explained by examples in the drawings and in the detailed descriptions of said drawings.

In one embodiment of a pitch lock system for a wind turbine, according to the invention, at least one guide rail is arranged non-parallel to the radial direction and thus with an angle different from 90° to the toothed element and substantially in the same plane as the pitch bearing construction. When the toothed segment is activated to move towards the toothed element, and thus into engagement between the parts, the toothed segment will always be guided or forced into a position where the teeth are aligned. In other words the toothed segment which is installed on a sliding block will be guided into an orthogonal/sideways motion and into a perfect position prior to full engagement and locking.

In one embodiment of a pitch lock system for a wind turbine, according to the invention, the teeth on the toothed segment are constructed with the same shape as the teeth on the toothed element. In another embodiment of the invention, the teeth on the toothed segment are constructed with a complementary shape to the shape of the teeth on the toothed element. In the last mentioned situation, a very firm locking is obtained as the teeth on the toothed element are completely covered on the load carrying faces. This way there is a larger contact area between the two active toothed parts.

The invention further comprises a wind turbine comprising at least one pitch lock system where the wind turbine is a two bladed wind turbine.

Even further the invention comprises a method for operating a pitch lock system for a wind turbine as described above, where said method comprises at least the following steps:
  positioning said fixture in relation to the toothed element.
  operating the actuator for moving the toothed segment towards the toothed element.

By positioning the fixture, either manually or more or less automatically using long holes or guide rails it is possible to adjust the position of the toothed segment to a perfect position in relation to the teeth on the toothed element before or during the motion of the toothed segment towards said toothed element.

In an embodiment of the method according to the invention, said method further comprises at least the following steps:
  operating the actuator for pressing the toothed segment towards the toothed element and into contact with the teeth of said toothed element, and thus forcing the sliding block in a combined radial and orthogonal to radial direction,
  operating said actuator even more until said sliding block is moved a sufficient distance in said orthogonal direction, said distance being dependent on the relative position between the teeth of the toothed element and the teeth of the toothed segment, until the toothed segment is fully engaged at the toothed element.

An embodiment of the invention will now be described, by way of example only, with reference to the accompanying drawings, in which:

In the following text, the figures will be described one by one and the different parts and positions seen in the figures will be numbered with the same numbers in the different figures. Not all parts and positions indicated in a specific figure will necessarily be discussed together with that figure.

DETAILED DESCRIPTION OF THE INVENTION

Figure 1:
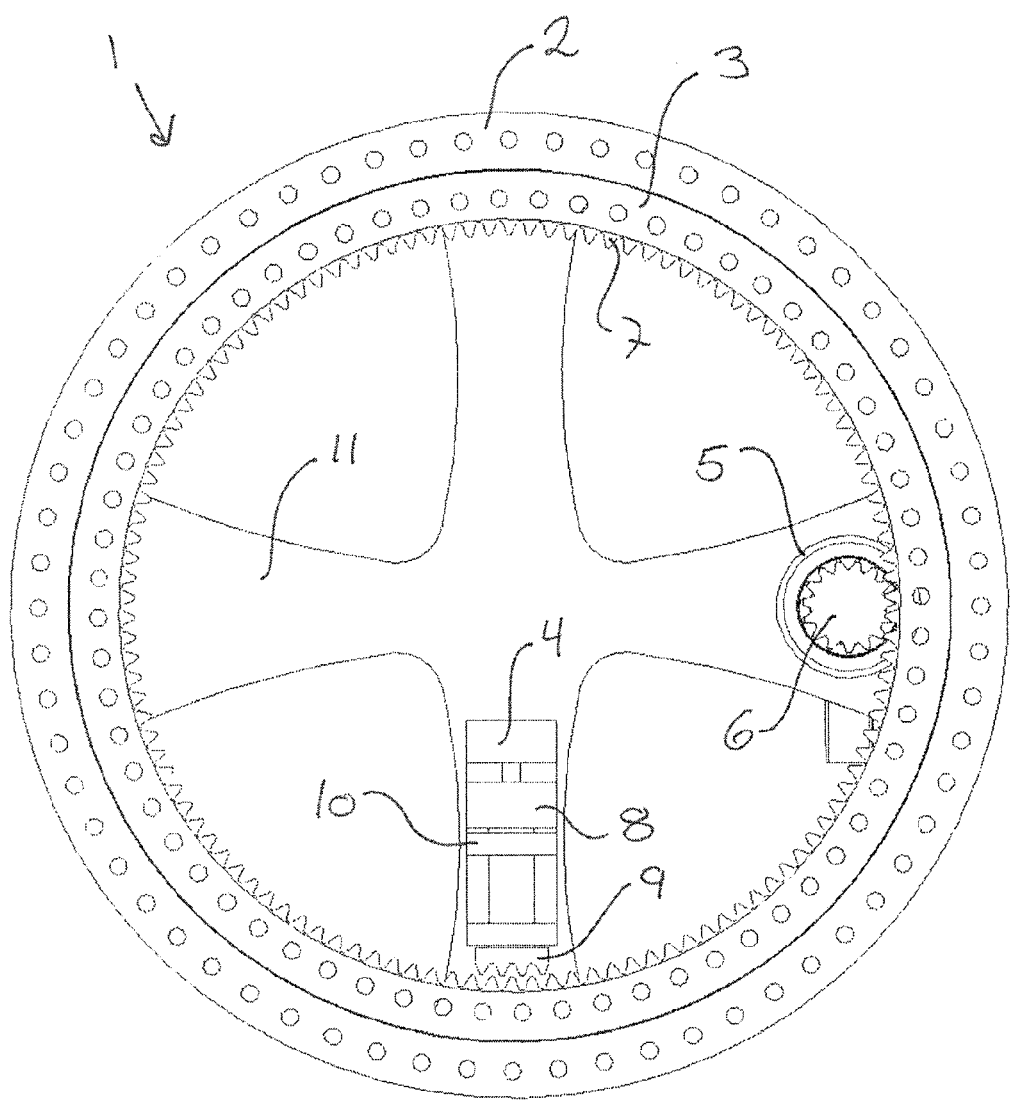
FIG. 1 shows a pitch bearing comprising a pitch lock system.

In FIG. 1, a pitch bearing construction 1 with a first bearing ring 2 and a second bearing ring 3 comprising a pitch lock system 4 and a pitch drive 5 is seen. On the first bearing ring 2 the pitch drive 5 is arranged with a pitch gear 6 that interacts with a toothed element 7 on the second bearing ring 3. By activating the pitch drive 5, the pitch gear 6 will rotate and thus rotate the second bearing ring 3 in relation to the first bearing ring 2. Typically the inner part of a partial pitch blade will be mounted to the flange of the first bearing ring 2 and the outer blade part will be mounted to the flange of the second bearing ring 3, but installation can also be done vice versa. The pitch gear 6 is only engaging the toothed element 7 with a single tooth as usual in such mechanisms and does as such not provide for a sufficient locking, although the pitch drive 5 is self locking.

The pitch lock system 4 is seen comprising an actuator 8 for moving a toothed segment 9 into engagement with the toothed element 7. With this solution, several teeth on the toothed segment are brought into engagement with the toothed element 7, and a very rigid and solid locking is performed.

Figure 2:
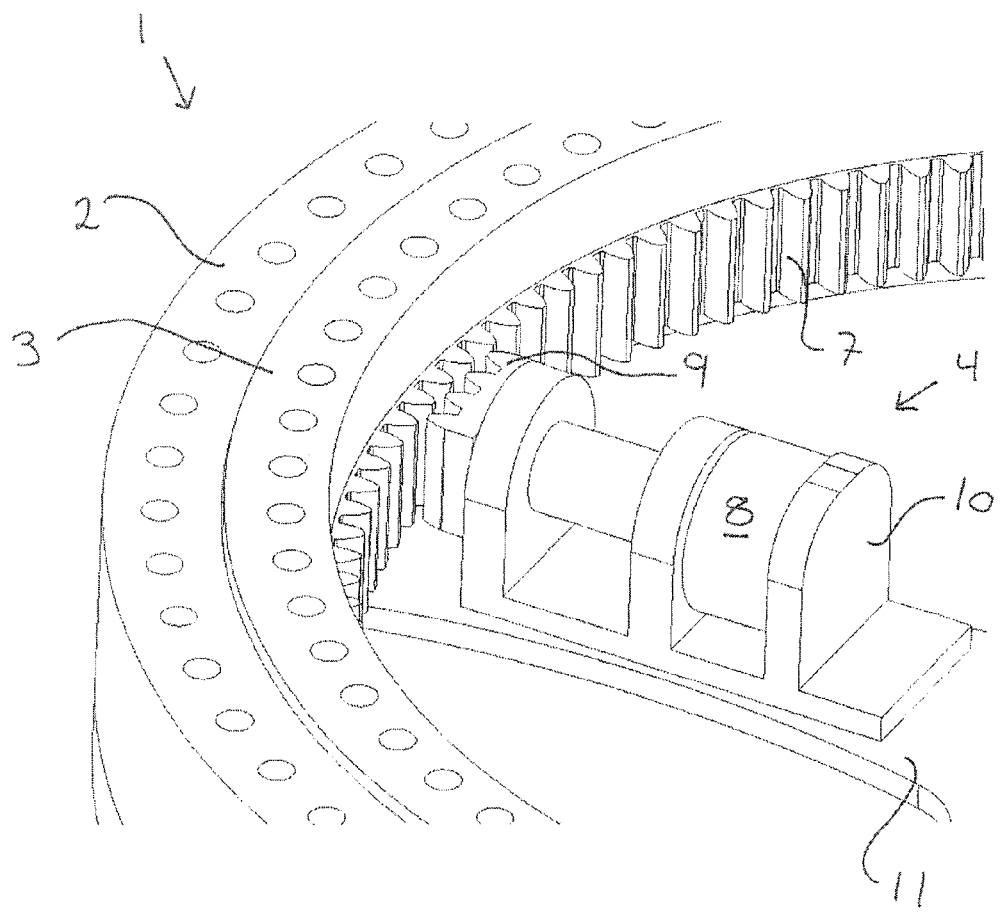
FIG. 2 shows an isometric view of an unlocked pitch bearing construction.

FIG. 2 shows an isometric view of an unlocked pitch bearing construction 1, where the pitch lock system 4 is seen in a simple set up. The actuator 8 and the toothed segment 9 are arranged in a kind of bracket 10 and are fixed to a construction part/stiffener spoke 11 connected to the first bearing ring 2.

Figure 3:
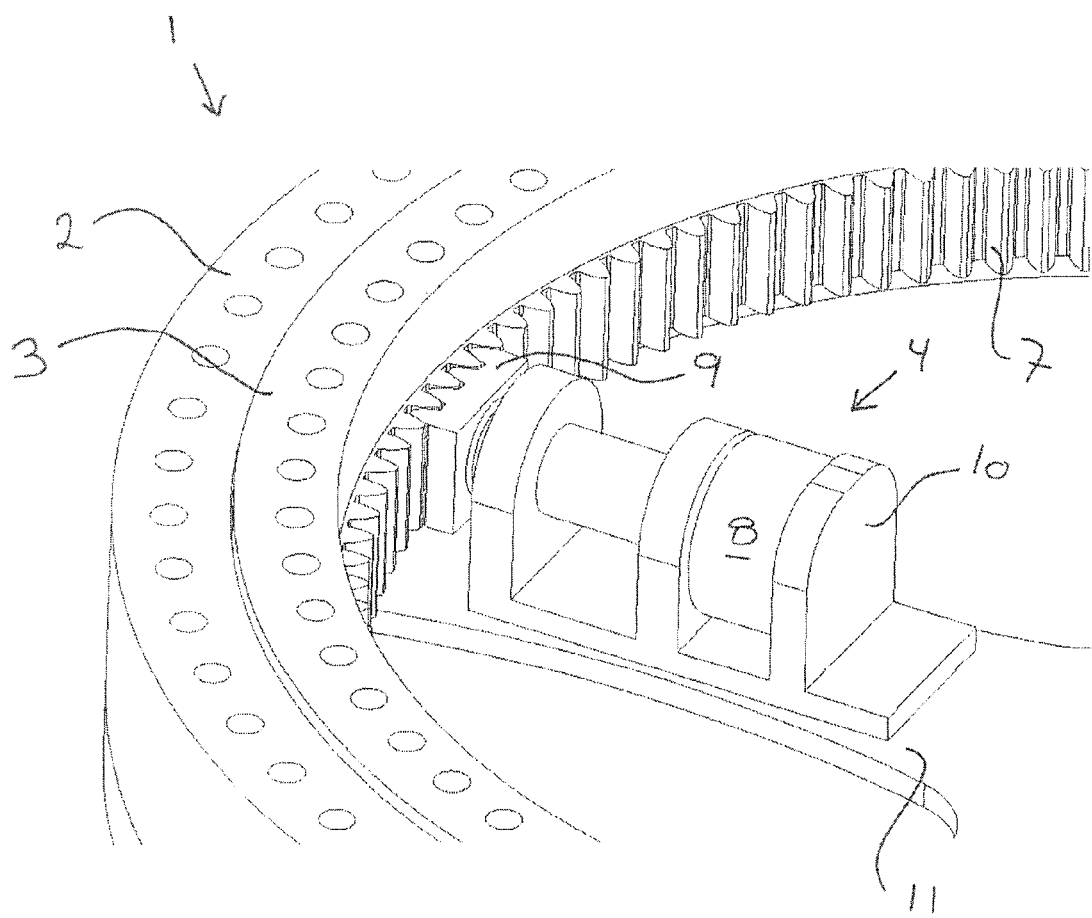
FIG. 3 shows an isometric view of a locked pitch bearing construction.

FIG. 3 shows the same isometric view as seen in FIG. 2, but in this figure the actuator 8 is activated and the toothed segment 9 is forced into engagement with the toothed element 7, thus locking the pitch bearing construction 1. The actuator 8 can be hydraulically, pneumatically, electrically or even manually operated. The purpose of the actuator 8 is to advance the toothed segment 9 into engagement with the toothed element 7 as seen in this figure.

Figure 4:
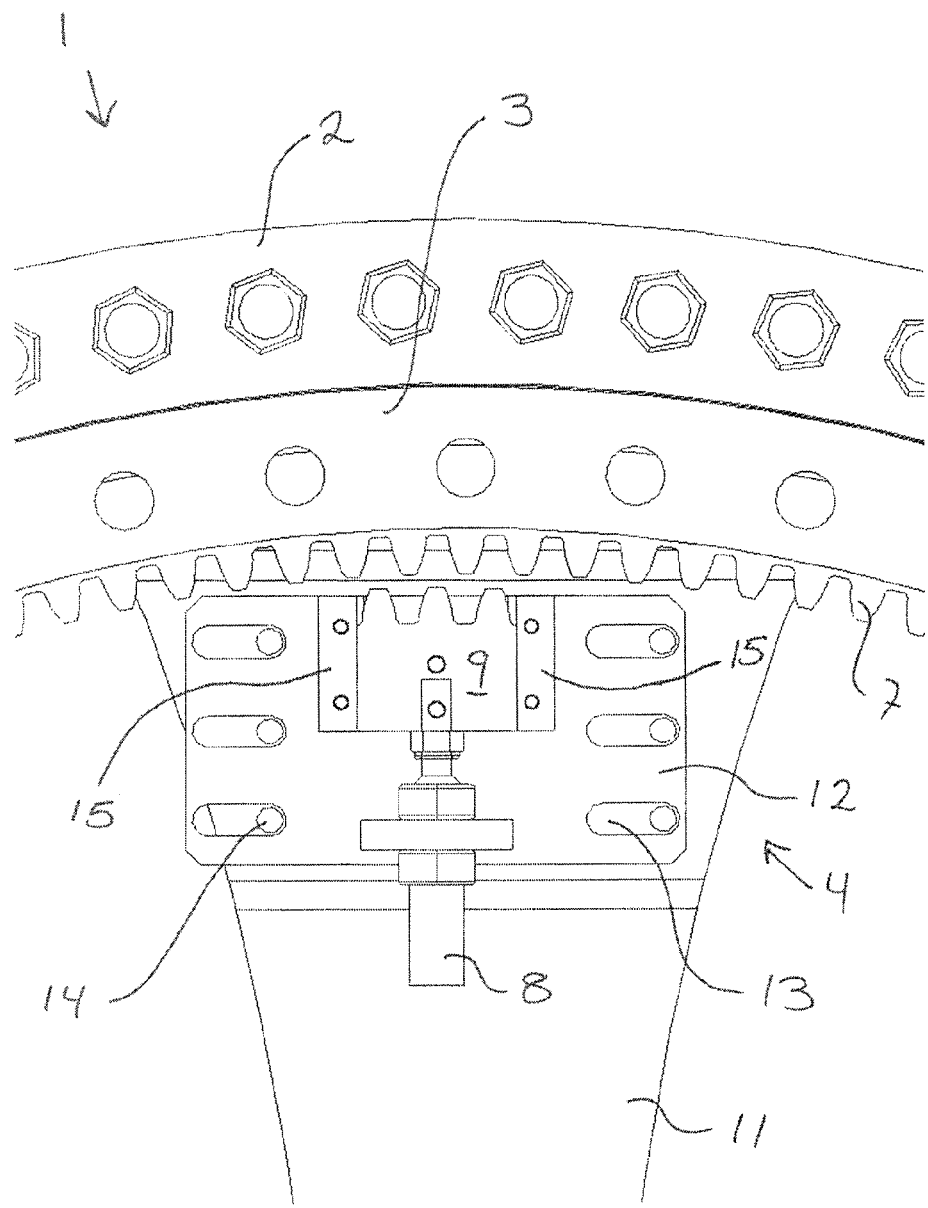
FIG. 4 shows a pitch lock system with a sideways adjustable fixture.

In FIG. 4, a pitch lock system 4 is seen, where the actuator 8 and the toothed segment 9 are arranged on a fixture 12, said fixture being sideways adjustable orthogonal to the radial direction and arranged on a construction part/stiffener spoke 11 which is in fixed connection with the first bearing ring 2. As the fixture 12 can be adjusted in long holes 13 in relation to the teeth of the toothed element 7/second bearing ring 3, the pitch lock system 4 can be positioned in exactly the right position, which allows for locking the pitch bearing construction 1 in any position. After positioning the fixture 12, it can be manually tightened via bolts and nuts 14, to the construction part/stiffener spoke 11, or a not shown mechanical semi or fully automatic system can be used for tightening the fixture 12 in the right position.

Further the toothed segment 9 is arranged on the fixture 12 between two sidebars 15, where the sidebars 15 guide the toothed segment 9, when it is moved between a retracted position, as seen in this figure, into an active position where the toothed segment 9 is engaged with the toothed element 7. In FIGS. 1, 2 and 3, the toothed segment 9 is guided by the actuator 8 and the bracket 10.

Figure 5:
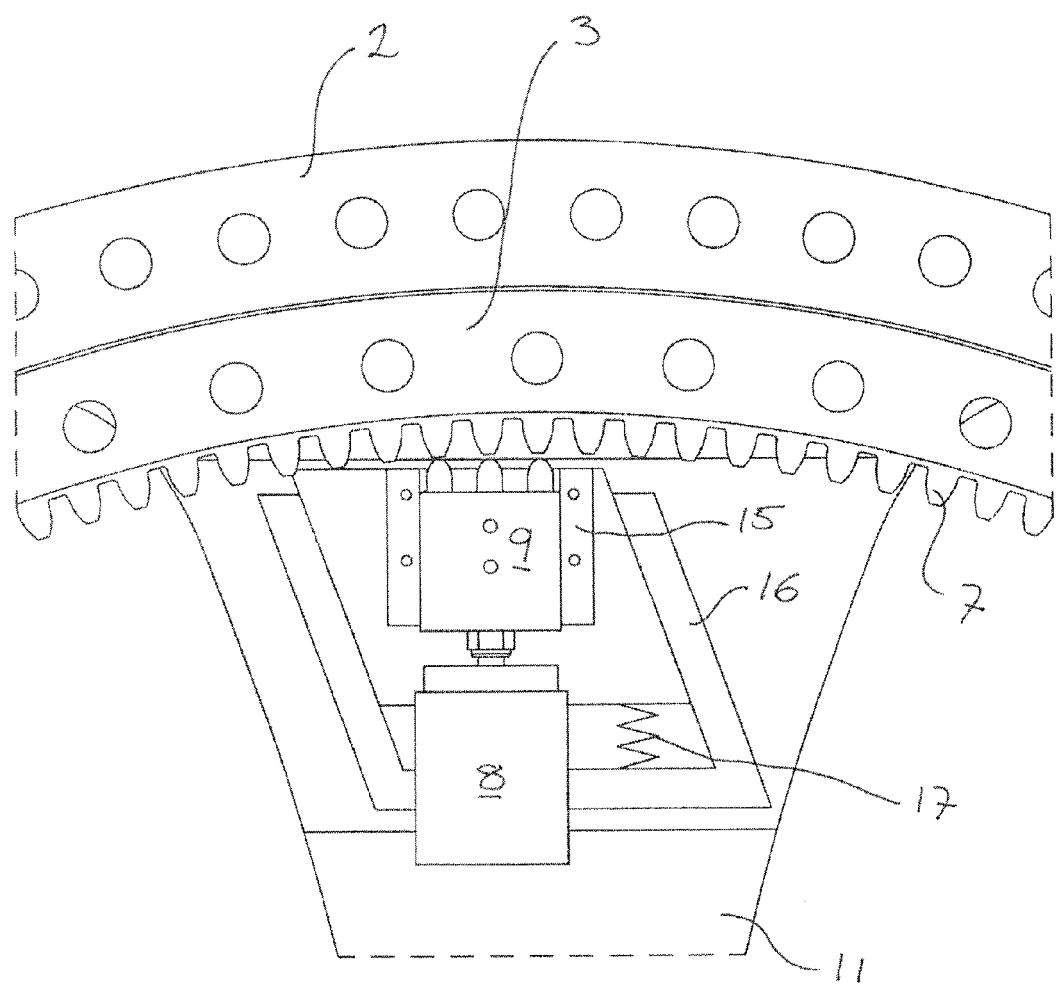
FIG. 5 shows a first position of a pitch lock system with an automatic sideways adjustable fixture.

FIG. 5 shows another solution where the pitch lock system 4 is seen in a first position and with another kind of sideways/orthogonally adjustable fixture 12. The system 4 comprises an actuator 8 in connection with the toothed segment 9, guided by the sidebars 15. In this situation the teeth of the toothed segment 9 are facing the teeth on the toothed element 7, and thus the pitch locking system 4 cannot be engaged without a sideways/orthogonal adjusting of the fixture 12. This is done automatically with this construction, as the actuator 8 and the toothed segment 9 are arranged on a sliding block 18 that will slide back and to the side when the pitch lock system 4 is activated by means of putting pressure on the actuator 8. The fixture 12 and the toothed segment 9 is arranged on said sliding block 18 and in connection with guide rails 16 arranged non-parallel to the radial direction and thus with an angle different from 90° to the toothed element 7, which allows for a sideways adjusting. In a not active position, the fixture 12/sliding block 18 is held in the position seen in FIG. 5 by a spring 17. The spring 17 can be a typically mechanical spring of any kind, but also a pneumatic spring or an elastomer or any other type of resilient material can be used.

Figure 6:
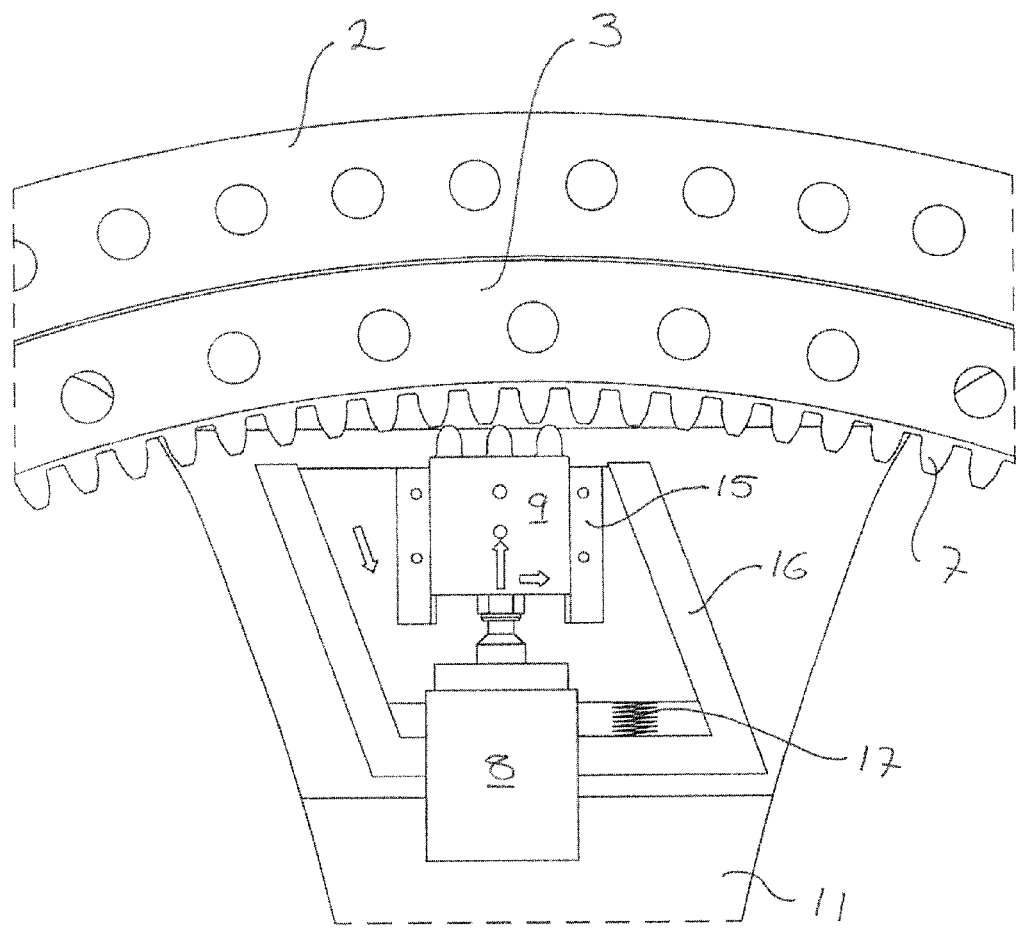
FIG. 6 shows second position of a pitch lock system with an automatic sideways adjustable fixture.

In FIG. 6, the same construction is seen in a second position, where the fixture 12/sliding block 18 is sliding backwards against the spring 17, and thus the teeth of the toothed segment 9 are moved sideways and orthogonal to the radial direction of pitch bearing construction.

Figure 7:
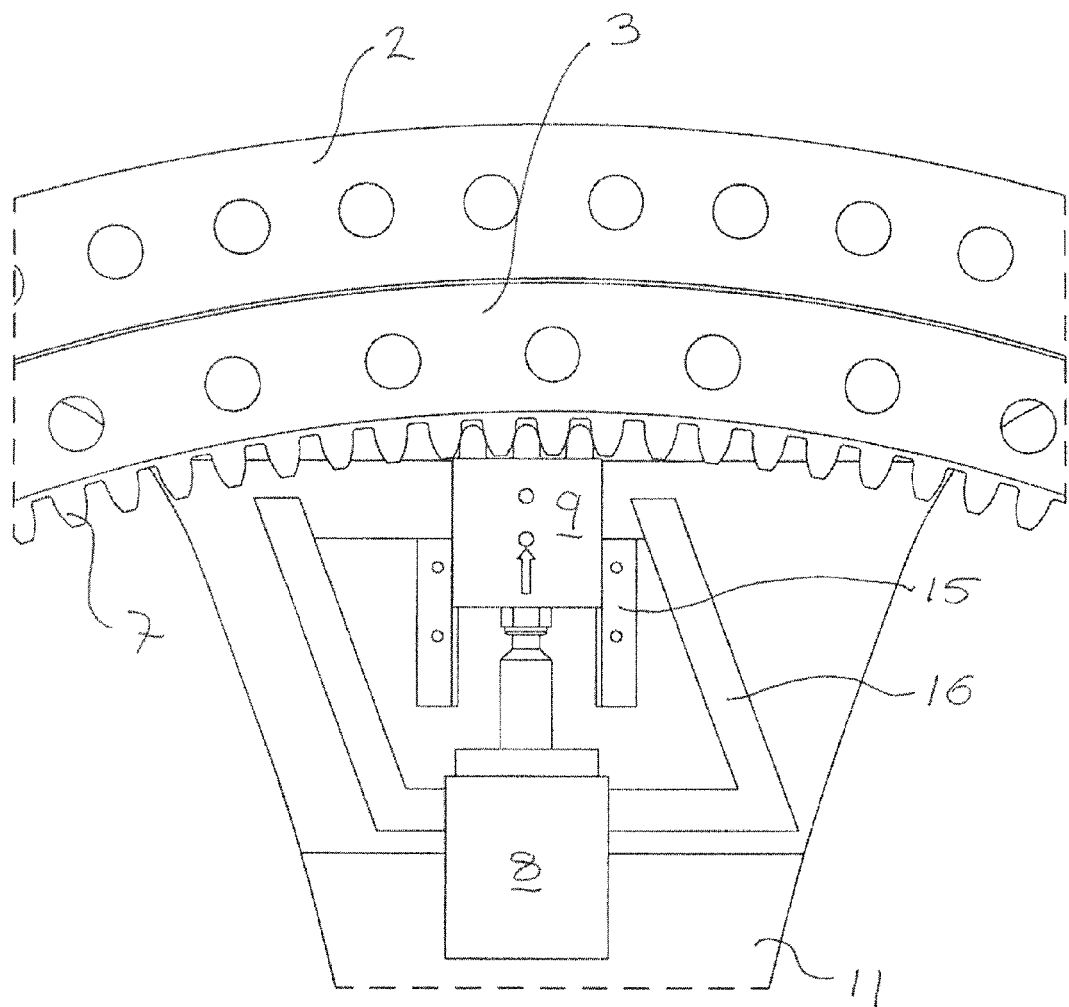
FIG. 7 shows a third position of a pitch lock system with an automatic sideways adjustable fixture.

In FIG. 7, a third position of a pitch lock system 4 with a sideways adjustable fixture 12 is seen. Now the fixture 12/sliding block 18 has been moved further back and to orthogonal to the side, guided by the guide rails 16 and into the exact position where the teeth on the toothed segment 9 fit right in between the teeth on the toothed element 7.

The invention is not limited to the embodiments described herein, and may be modified or adapted without departing from the scope of the present invention as described in the patent claims below.

What is claimed is:

1. A pitch lock system for a wind turbine with a rotor, said rotor comprising at least one pitchable blade, where at least a part of said at least one blade is connected to an interface, said interface comprising a pitch bearing construction with a first bearing ring and a second bearing ring, for pitching the at least a part of said at least one blade in relation to said rotor, wherein the pitch lock system comprises a movable toothed segment for interacting with at least one toothed element, where said toothed segment is slideably connected with one of the first and second bearing rings, and where said at least one toothed element is in fixed connection with the other of the first and second bearing ring, and where the pitch lock system further comprises an actuator for activating and moving said movable toothed segment in a direction parallel to a radial direction of the bearing ring and into engagement with said at least one toothed element and thus locking the pitch bearing construction wherein the toothed segment is arranged on a fixture, where said fixture comprises means for adjusting of the fixture in at least a direction orthogonal to the radial direction, in relation to the at least one toothed element.

2. A pitch lock system for a wind turbine according to claim 1, wherein the at least one toothed element has a circular arc shape, where the teeth are placed on the inside of said circular arc.

3. A pitch lock system for a wind turbine according to claim 1, wherein said toothed segment comprises at least two teeth, where said at least two teeth are arranged for engaging with at least two corresponding teeth on said at least one toothed element.

4. A pitch lock system for a wind turbine according to claim 1, wherein said means for adjusting of the fixture comprises long holes having a longitudinal direction orthogonal to the radial direction, said long holes in said fixture being in a plane parallel to the plane of said pitch bearing construction.

5. A pitch lock system for a wind turbine according to claim 1, wherein the fixture comprises means for automatically orthogonal adjusting in relation to said radial direction, where said means for automatically orthogonal adjusting comprises at least one guide rail arranged non-parallel to the radial direction and thus with an angle different from 90° to the at least one toothed element, for guiding the fixture comprising the toothed segment in an orthogonal direction, where said fixture and the toothed segment is arranged on a sliding block, said sliding block being guided by said at least one guide rail.

6. A pitch lock system for a wind turbine according to claim 1, wherein the fixture comprises biasing means for biasing said sliding block in a direction towards the toothed element.

7. A pitch lock system for a wind turbine according to claim 5, wherein the at least one guide rail is arranged non-parallel to the radial direction and thus with an angle different from 90° to the at least one toothed element and substantially in the same plane as the pitch bearing construction.

8. A pitch lock system for a wind turbine according to claim 1, wherein the teeth on the toothed segment are constructed with the same shape as the teeth on the at least one toothed element.

9. A pitch lock system for a wind turbine according to claim 1, wherein the teeth on the toothed segment are constructed with a complementary shape to the shape of the teeth on the toothed element.

10. A wind turbine comprising at least one pitch lock system according to claim 1, wherein the wind turbine is a two bladed wind turbine.

11. A pitch lock system for a wind turbine according to claim 1, wherein the means for adjusting of the fixture is configured to move in a combined radial and orthogonal to radial direction, in relation to the at least one toothed element.

12. A method for operating a pitch lock system for a wind turbine according to claim 1 wherein said method comprises at least the following steps:
  positioning said fixture in relation to the toothed element,
  operating the actuator for moving the toothed segment towards the at least one toothed element.

13. A method according to claim 12, wherein said method further comprises at least the following steps:
  operating the actuator for pressing the toothed segment towards the at least one toothed element and into contact with the teeth of said toothed element, and thus forcing the sliding block in a combined radial and orthogonal to radial direction,
  then further operating said actuator until said sliding block is moved a certain distance in said orthogonal direction into a position where the toothed segment is aligned with the at least one toothed element, said certain distance being dependent on the relative position between the teeth of the at least one toothed element and the teeth of the toothed segment until the toothed segment is fully engaged at the at least one toothed element.

* * * * *